US006997421B2

(12) United States Patent
Reynolds et al.

(10) Patent No.: US 6,997,421 B2
(45) Date of Patent: Feb. 14, 2006

(54) HANDS-FREE STYLIST STAND

(76) Inventors: Anne Vandette Reynolds, 21 Thomson Creek Blvd, Woodbridge, ON (CA) L4H 1B7; Liliane Vandette, 21 Thomson Creek Blvd, Woodbridge, ON (CA) L4H 1B7

(*) Notice: Subject to any disclaimer, the term of this patent is extended or adjusted under 35 U.S.C. 154(b) by 0 days.

(21) Appl. No.: 10/715,754

(22) Filed: Nov. 18, 2003

(65) Prior Publication Data

US 2004/0149875 A1    Aug. 5, 2004

(30) Foreign Application Priority Data

Nov. 20, 2002   (CA)   ................................. 2412402

(51) Int. Cl.
*D06F 79/02*   (2006.01)
(52) U.S. Cl. ........................................ 248/117.2; 34/90
(58) Field of Classification Search ................ 248/160, 248/274.1, 315, 121, 117.1, 117.2, 117.3, 248/117.4, 117.5, 117.6, 117.7, 540, 541; 34/90, 97; D28/17, 18; 42/94; 224/912; 211/64, 69, 85.18; 43/21.2
See application file for complete search history.

(56) References Cited

U.S. PATENT DOCUMENTS

| 2,917,257 | A | * | 12/1959 | Dorman ...................... 248/514 |
| D222,964 | S | * | 2/1972 | Woodbury ................. D22/147 |
| 4,225,106 | A | * | 9/1980 | Eplan ....................... 248/282.1 |
| 4,453,695 | A | * | 6/1984 | Sennott et al. .............. 248/660 |
| 4,506,317 | A | * | 3/1985 | Duddy ........................ 362/396 |
| 4,712,313 | A | * | 12/1987 | Gettleman .................... 34/97 |
| 5,064,154 | A | * | 11/1991 | Payne ........................ 248/121 |
| D332,670 | S | * | 1/1993 | McFarland ................. D28/38 |
| 5,350,144 | A | * | 9/1994 | Lary ....................... 248/183.1 |
| 5,590,475 | A | * | 1/1997 | Andis ........................... 34/97 |
| 5,761,825 | A | * | 6/1998 | Ammon et al. ................ 34/97 |
| D400,037 | S | * | 10/1998 | Bartholow ................... D6/566 |
| 5,937,537 | A | * | 8/1999 | Miller ........................... 34/97 |
| 5,956,861 | A | * | 9/1999 | Barnes ......................... 34/90 |
| 6,390,424 | B1 | * | 5/2002 | Kidushim et al. ....... 248/122.1 |
| 6,651,374 | B1 | * | 11/2003 | Ridlen ....................... 43/21.2 |

FOREIGN PATENT DOCUMENTS

GB    529686    * 11/1940   ................. 248/121

* cited by examiner

*Primary Examiner*—Ramon O Ramirez
(74) *Attorney, Agent, or Firm*—Eric Fincham

(57) ABSTRACT

An assembly for holding a portable hair dryer which has a handle and a nozzle, the assembly comprising a cradle having upper and lower portions to respectively support the nozzle and handle, a mounting arrangement for securing the assembly to a substrate such as a wall or table, and a connecting assembly which permits movement of the cradle in different directions. The assembly permits hands-free use of a portable hand-held hair dryer.

13 Claims, 5 Drawing Sheets

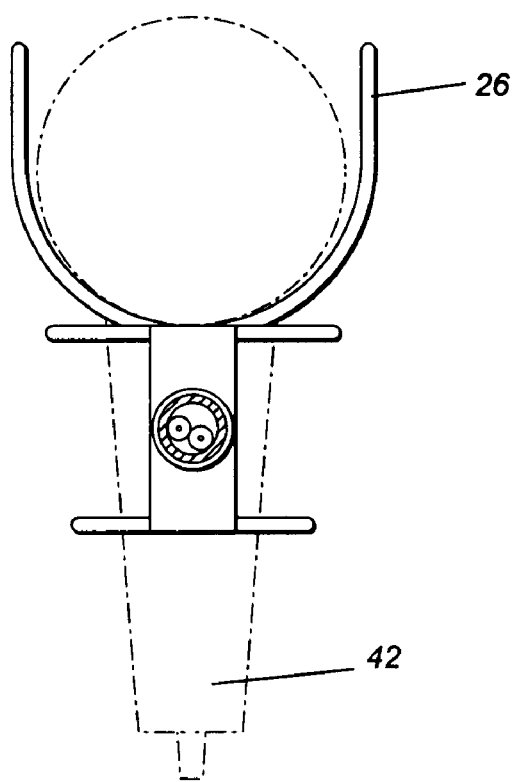
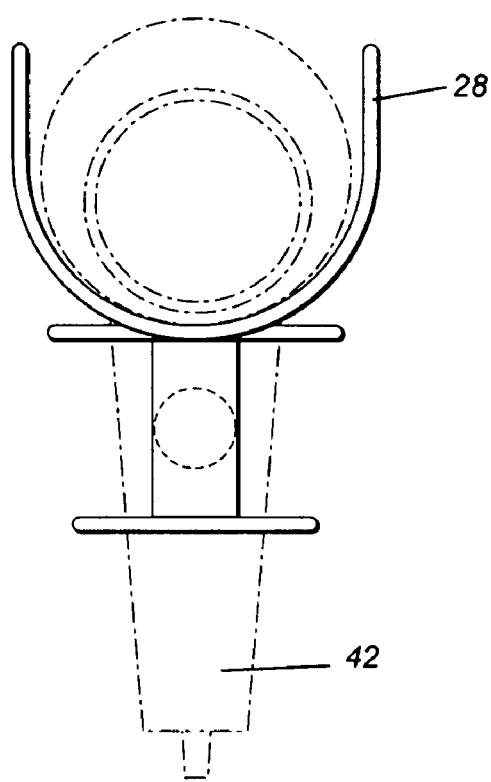
Fig-4            Fig-5

HANDS-FREE STYLIST STAND

FIELD OF THE INVENTION

The present invention relates to a support assembly and more particularly, relates to a support assembly designed for use with a hand-held hair dryer.

BACKGROUND OF THE INVENTION

The use of hand-held hair dryers is widely practised and many such hand-held hair dryers are known in the art. The hand-held hair dryers have replaced the older bonnet type hair dryers which are now only normally associated with hair salons or the like. Even with hair salons, many use the portable hand-held hair dryers as it permits both flexibility and speed.

One of the prime advantages of the hand-held hair dryer is their portability and relatively low cost. Many different brands of hand-held hair dryers exist with many different configurations. However, most of such hand-held hair-dryers have a handle portion containing the trigger for activating the hair dryer and a nozzle portion from which the hot air emanates.

One advantage which the bonnet type hair dryer has compared to the hand-held hair dryer is that the hands are free to utilize the various accessories available for manipulating the hair during the drying process. In order to overcome this disadvantage, it has been proposed in the art that various types of implements be employed to hold the hand-held type hair dryer during the drying step. While many such proposals exist in the patent literature, they have not being accepted in the commercial world, neither with professionals nor the home user. It is believed that the reasons for non-acceptance can include the relatively complex nature of many of the devices as well as their lack of adjustability. Furthermore, many are not suitable for use with today's hand-held hair dryers.

SUMMARY OF THE INVENTION

It is an object of the present invention to provide an assembly for holding a hands free hair dryer and which assembly is both suited for different types of hair dryers and provides for flexibility of positioning.

According to one aspect of the present invention, there is provided an assembly for holding a portable hair dryer having a handle and a nozzle comprising a cradle for holding the hair dryer, the cradle having a lower portion adapted to receive the handle of the hair dryer and an upper portion to receive and support the nozzle of the hair dryer, the upper portion having a generally U-shaped configuration to receive the nozzle, the upper portion having a longitudinal axis lying in a first plane, the lower portion of the cradle having an upper ring and a lower ring to receive the handle, the upper ring being larger than the lower ring, the upper and the lower ring having a central axis which lies in a second plane which is generally perpendicular to the first plane, a mounting means designed to be mounted to a substrate, and a connecting assembly between the mounting means and the cradle, the connecting assembly permitting movement of the cradle in at least two mutually perpendicular planes.

The assembly of the present invention, as aforementioned, includes a cradle which is adapted to receive and hold the hand-held hair dryer. To this end, there is provided a lower portion which is designed to receive the end handle of the hair dryer and the upper portion which is designed to support the nozzle of the hair dryer. It will be understood that the hair dryer is a conventional one wherein there is provided a nozzle with a downwardly extending handle portion. The handle portion conventionally contains the controls for the dryer.

In one embodiment, the upper portion and lower portion of the cradle are both formed of rod-like elements configured to a desired shape. In this embodiment, the lower portion is comprised of two ring-like elements, with the upper ring being sized larger than the lower ring to accommodate various types of hand-held hair dryers.

The upper portion of the cradle preferably has an overall U-shaped configuration which is designed to support the nozzle of the hand-held hair-dryer. In a manner similar to the lower portion designed to hold the handle, the upper portion may likewise be formed of rod-like elements. Alternatively, the U-shaped portion may be formed of a solid piece of material.

The means for mounting the assembly to a substrate may comprise any conventional. Thus, one may use various types of clamps or other attachments or indeed, the mounting means may take the form of a stand which is designed to merely stand on the floor.

Intermediate the mounting means and the cradle is a connecting assembly which permits movement of the cradle in the various directions. Various types of connecting assemblies may be employed including scissor arrangements, goose necks, etc.

BRIEF DESCRIPTION OF THE DRAWINGS

Having thus generally described the invention, reference will be made to the accompanying drawings illustrating embodiments thereof, wherein:

FIG. 4 is a rear elevational view thereof;

FIG. 5 is a front elevational view thereof;

DESCRIPTION OF THE PREFERRED EMBODIMENTS

Figure 1:
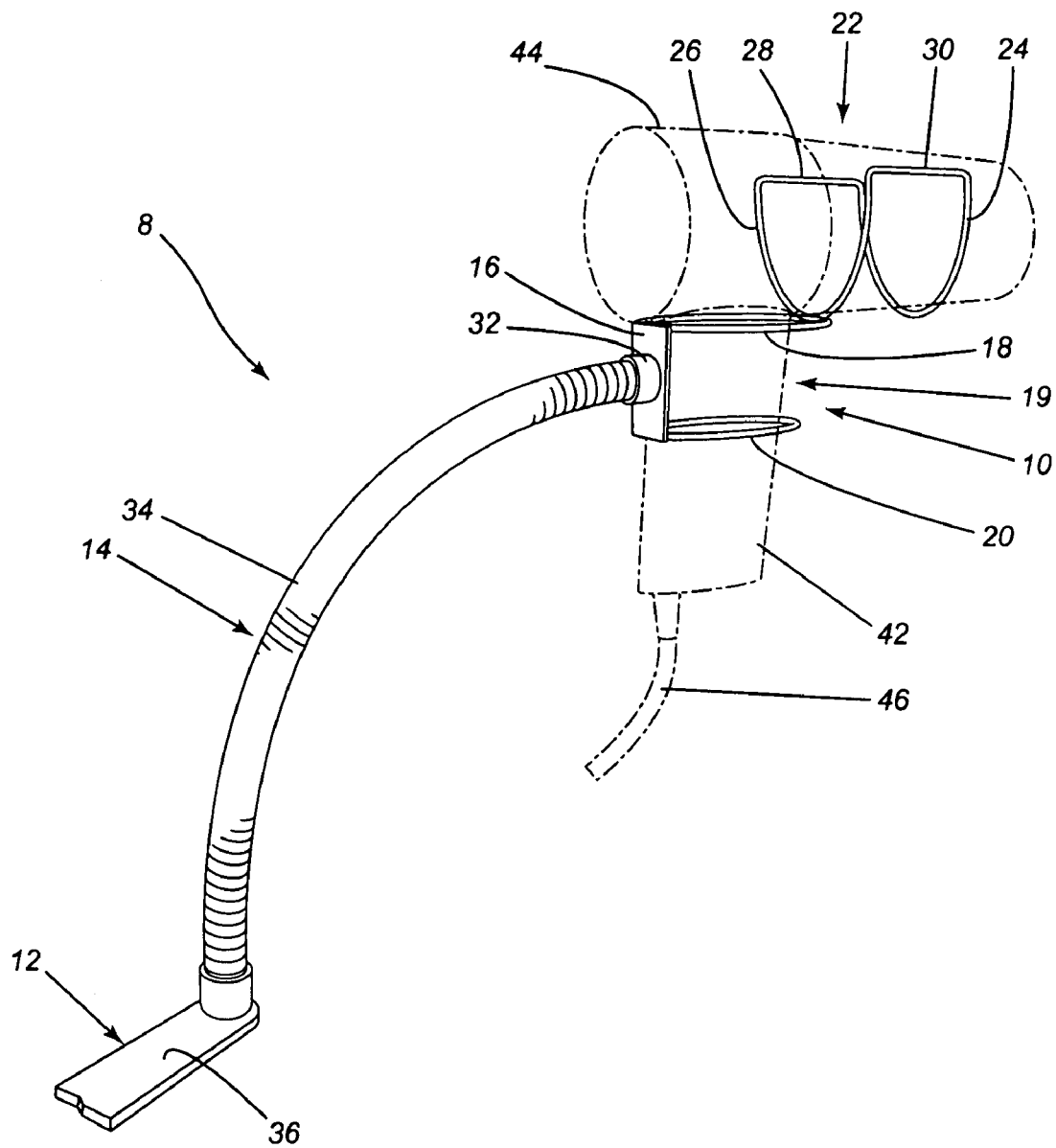
FIG. 1 is a perspective view illustrating one embodiment of an assembly according to the present invention.
Figure 2:
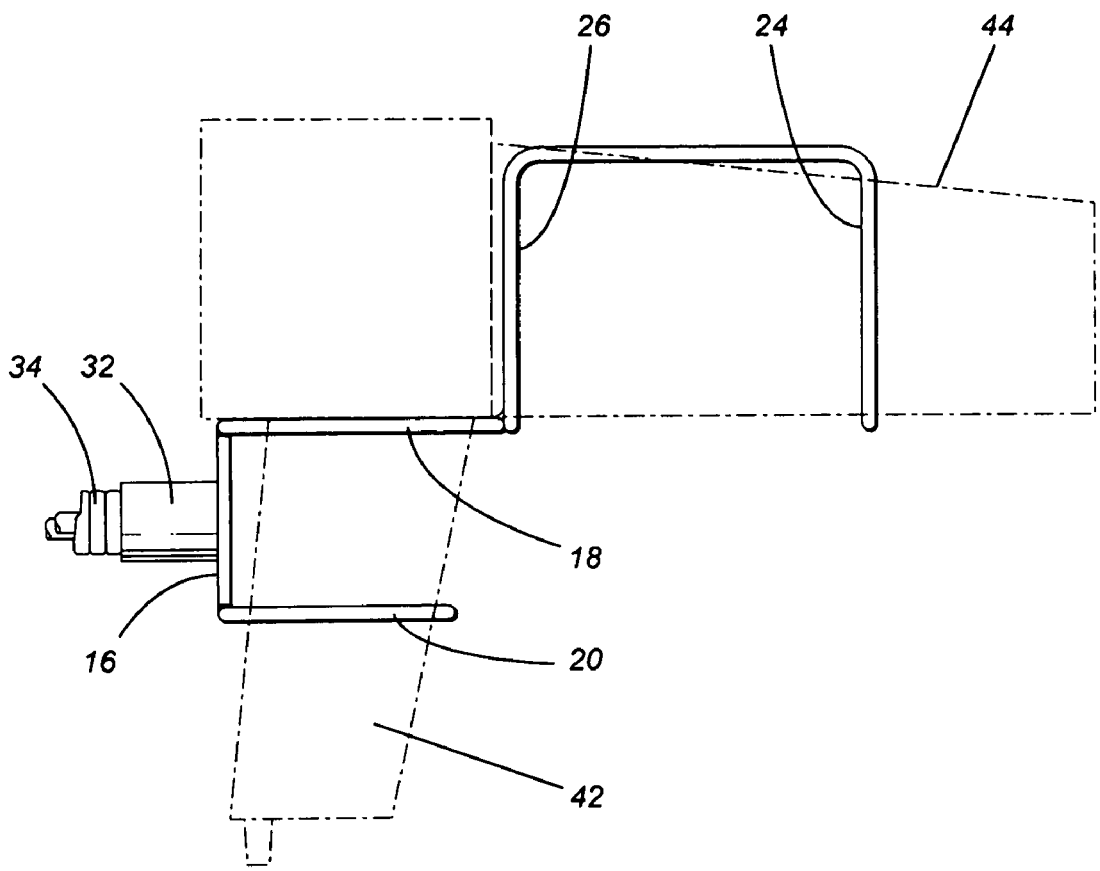
FIG. 2 is a side elevational view of the cradle portion thereof.
Figure 3:
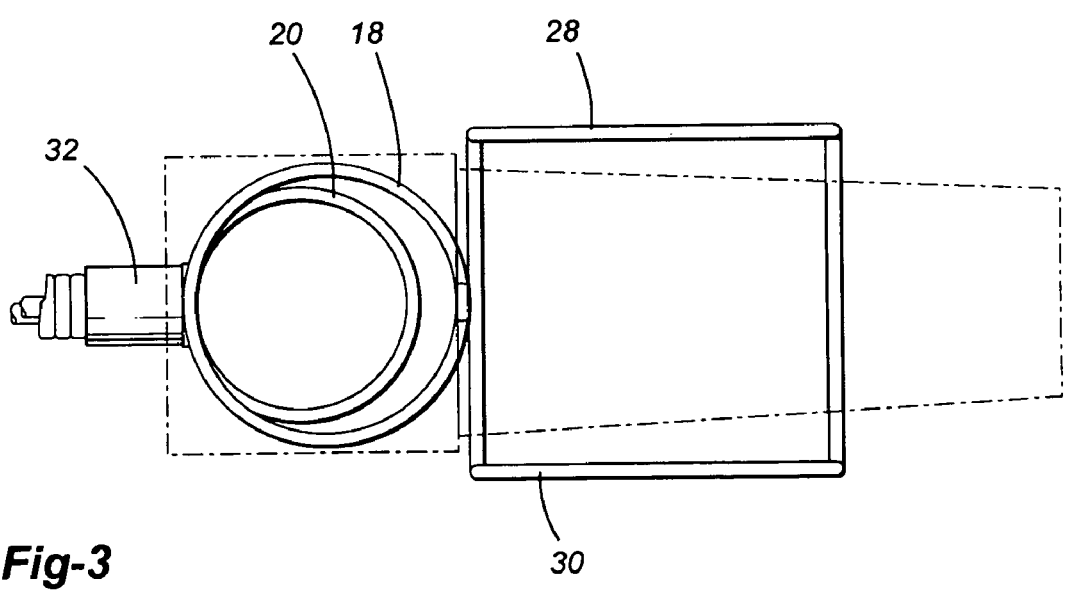
FIG. 3 is a top plan view thereof.

Referring to the drawings in greater detail and by reference characters thereto, there is illustrated a support assembly which is generally designated by reference numeral 8.

Support assembly 8 includes a cradle portion generally designated by reference numeral 10, a mounting portion generally designated by reference numeral 12, and a connecting portion generally designated by reference numeral 14 and which is intermediate to cradle portion 10 and mounting portion 12.

Cradle portion 10, as may be seen in FIG. 1, includes a back plate 16 to which there is secured an upper ring 18 and a lower ring 20. It will be noted that upper ring 18 is sized to have a larger diameter than that of lower ring 20. Back plate 16, upper ring 18 and lower ring 20 define a handle support portion 19.

There is also provided a nozzle support which is generally designated by reference numeral 22 and which includes a front U-shaped element 24 and a rear U-shaped element 26 which are connected by connecting arms 28 and 30. As may be seen in the drawings, rear U-shaped element 26 is secured to upper ring 18.

Extending outwardly and rearwardly from back plate 16 is a socket 32. Socket 32 is designed to receive a goose neck 34 which forms the connecting portion 14. Goose necks are well known in the art and need not be discussed herein.

Mounting member 36 is only partially shown and can form a part of a clamp or alternatively, be a vertical stand.

As shown in dotted lines, a hair dryer is supported by cradle 10 with the handle portion 42 thereof extending through upper ring 18 and lower ring 20. Nozzle portion 44 is supported by nozzle support 22 and in particular, by U-shaped elements 24, 26. Cord 46 of hair dryer 40 is appropriately connected to an electrical outlet.

As will be seen from the above, there is provided a simple yet convenient support for the hair dryer 40 while permitting access to the controls thereon.

Figure 6:
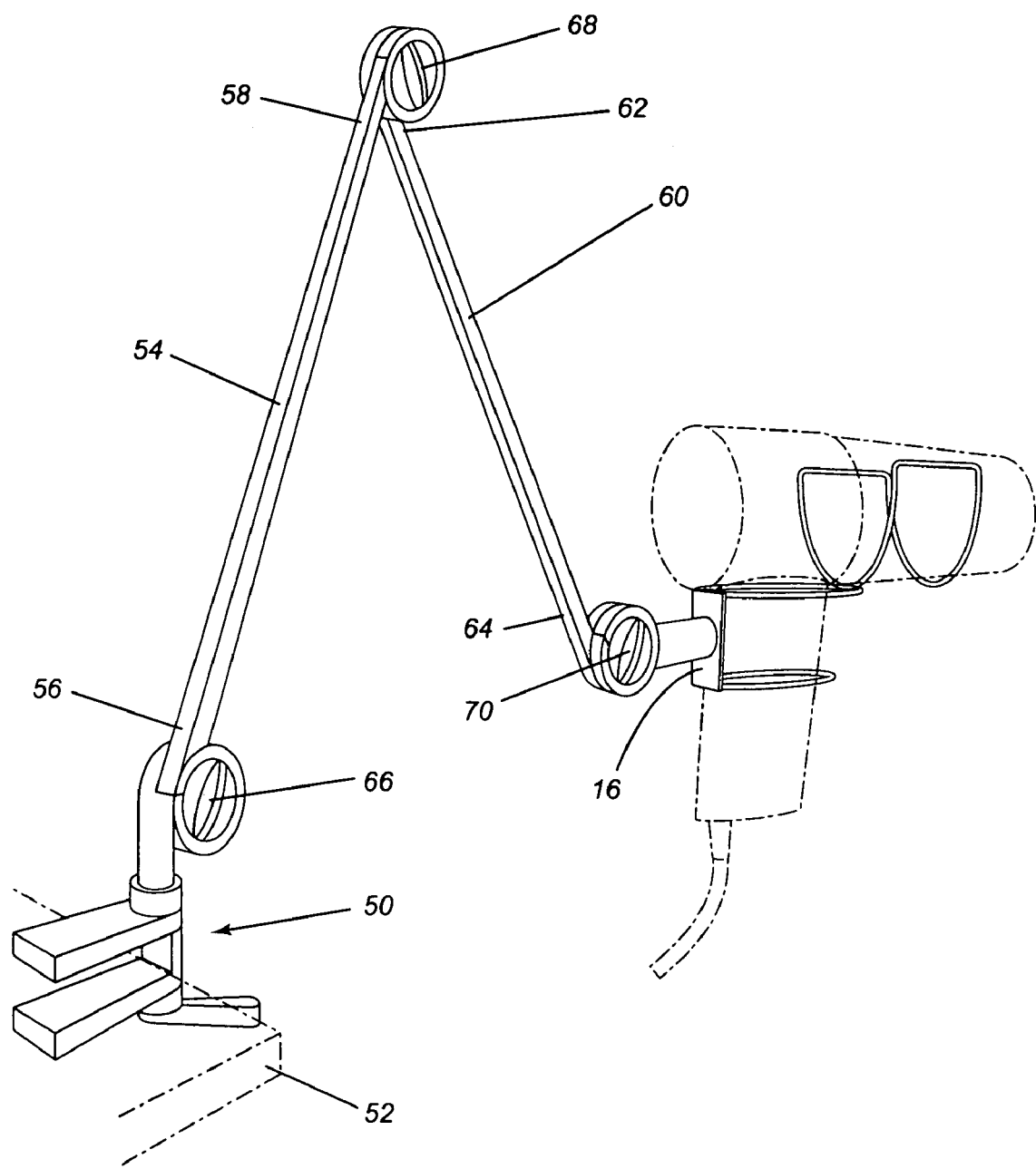
FIG. 6 is a perspective view of a modified embodiment of the device of the present invention.

In the embodiment of FIG. 6, there is provided a clamp 50 which forms the mounting portion 12 and which is designed to be secured to a table 52. From clamp 50, there extends a first arm 54 which has a first end 56 rotatably secured to clamp 50 through member 66 and a second hand 58 rotatably secured to a locking member 68. A second arm 60 has a first end 62 secured to a rotatable connecting member 68 and a second end 64 secured to a further rotatable member 70 which in turn is secured to back plate 16. Members 66, 68 and 70 can lock the arms in any desired position.

Figure 7:
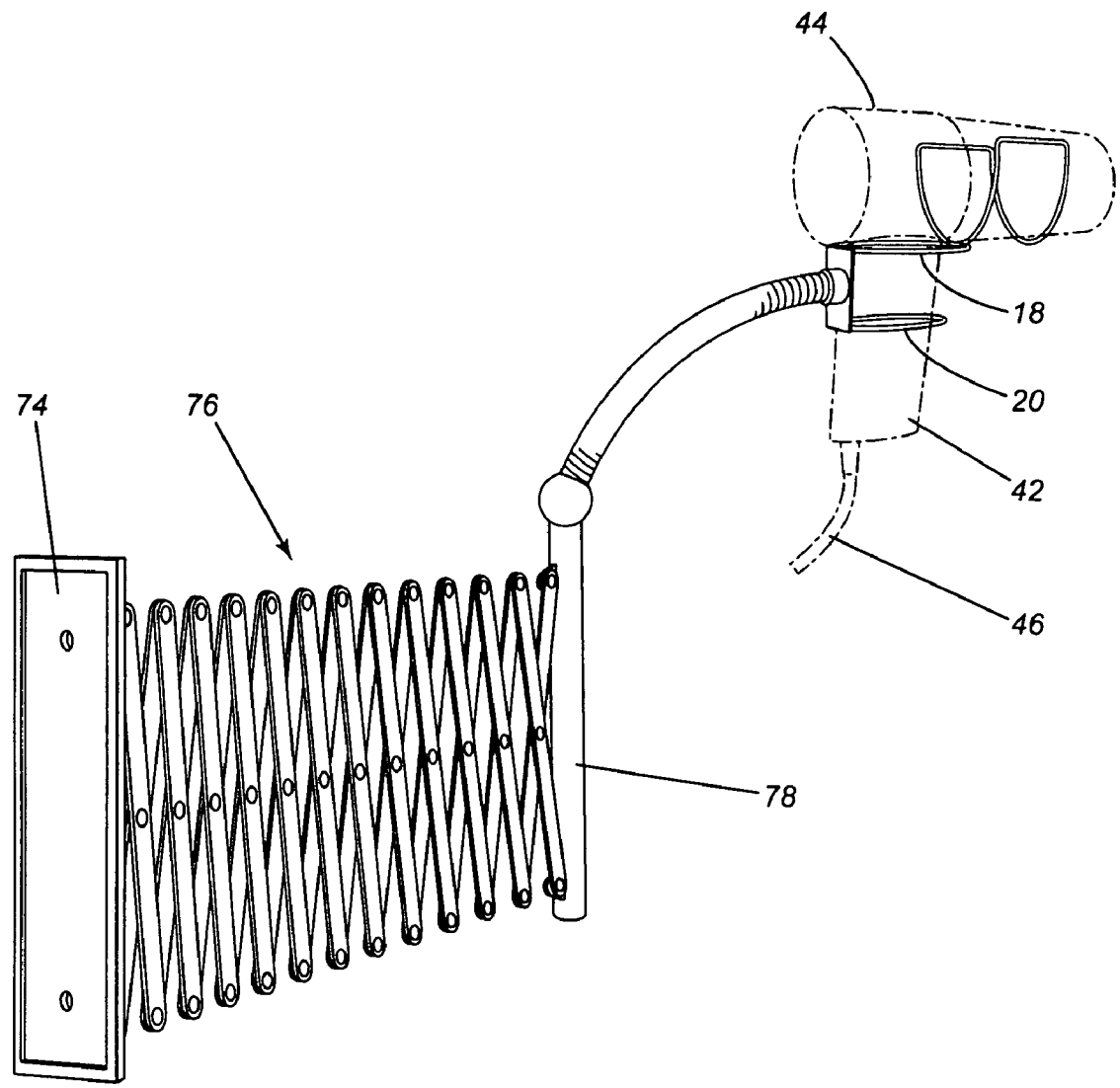
FIG. 7 is a perspective view of a still further embodiment of the present invention.

In a further embodiment, and as illustrated in FIG. 7, there is provided a wall plate 74 designed to be mounted to a wall. A scissor arm assembly 76 is utilised which is connected to an arm 78 on top of which is mounted goose neck 34.

It will be understood that the above described embodiments are for purposes of illustration only and that changes and modifications may be made thereto without departing from the spirit and scope of the invention.

We claim:

1. An assembly for holding a portable hair dryer having a handle and a nozzle comprising:
   a cradle for holding said hair dryer, said cradle having a lower portion adapted to receive the handle of said hair dryer and an upper portion to receive and support the nozzle of the hair dryer, said upper portion having a generally U-shaped configuration to receive said nozzle, said upper portion having a longitudinal axis lying in a first plane, said lower portion of said cradle having an upper ring and a lower ring to receive said handle, said upper ring being larger than said lower ring, said upper ring and said lower ring having a central axis which lies in a second plane which is generally perpendicular to said first plane;
   a mounting means designed to be mounted to a substrate; and
   a connecting assembly between said mounting means and said cradle, said connecting assembly permitting movement of said cradle in at least two mutually perpendicular planes.

2. The assembly of claim 1 wherein said connecting assembly permits movement in three mutually perpendicular planes.

3. The assembly of claim 2 wherein said connecting assembly comprises a goose neck.

4. The assembly of claim 2 wherein said connecting assembly comprises a scissor arrangement having one end thereof connected to said mounting assembly and a second end connected to a said cradle.

5. The assembly of claim 4 further including a goose neck interposed between said second end of said scissor arrangement and said cradle.

6. The assembly of claim 5 wherein said goose neck is mounted on top of said second end of said scissor arrangement.

7. The assembly of claim 2 wherein said connecting assembly includes first and second pair of arms, a first end of first said arm being connected to said mounting means, a second end of said first arm rotatably connected to a first end of said second arm, said second end of said second arm being connected to said cradle.

8. The assembly of claim 1 wherein said upper portion of said cradle is U-shaped and formed of rod members.

9. The assembly of claim 8 wherein a first one of said rod members is secured to said upper ring.

10. The assembly of claim 1 wherein said connecting assembly comprises a scissor arrangement having one end thereof connected to said mounting assembly and a second end connected to a said cradle.

11. The assembly of claim 1 wherein said connecting assembly includes first and second pairs of arms, a first end of said first arm being connected to said mounting means, a second end of said first arm being rotatably connected to a first end of said second arm, said second end of said second arm being connected to said cradle.

12. The assembly of claim 1 further including a goose neck interposed between said second end of said scissor arrangement and said cradle.

13. The assembly of claim 12 wherein said goose neck is mounted on top of said second end of said scissor arrangement.

* * * * *